Patented Aug. 29, 1939

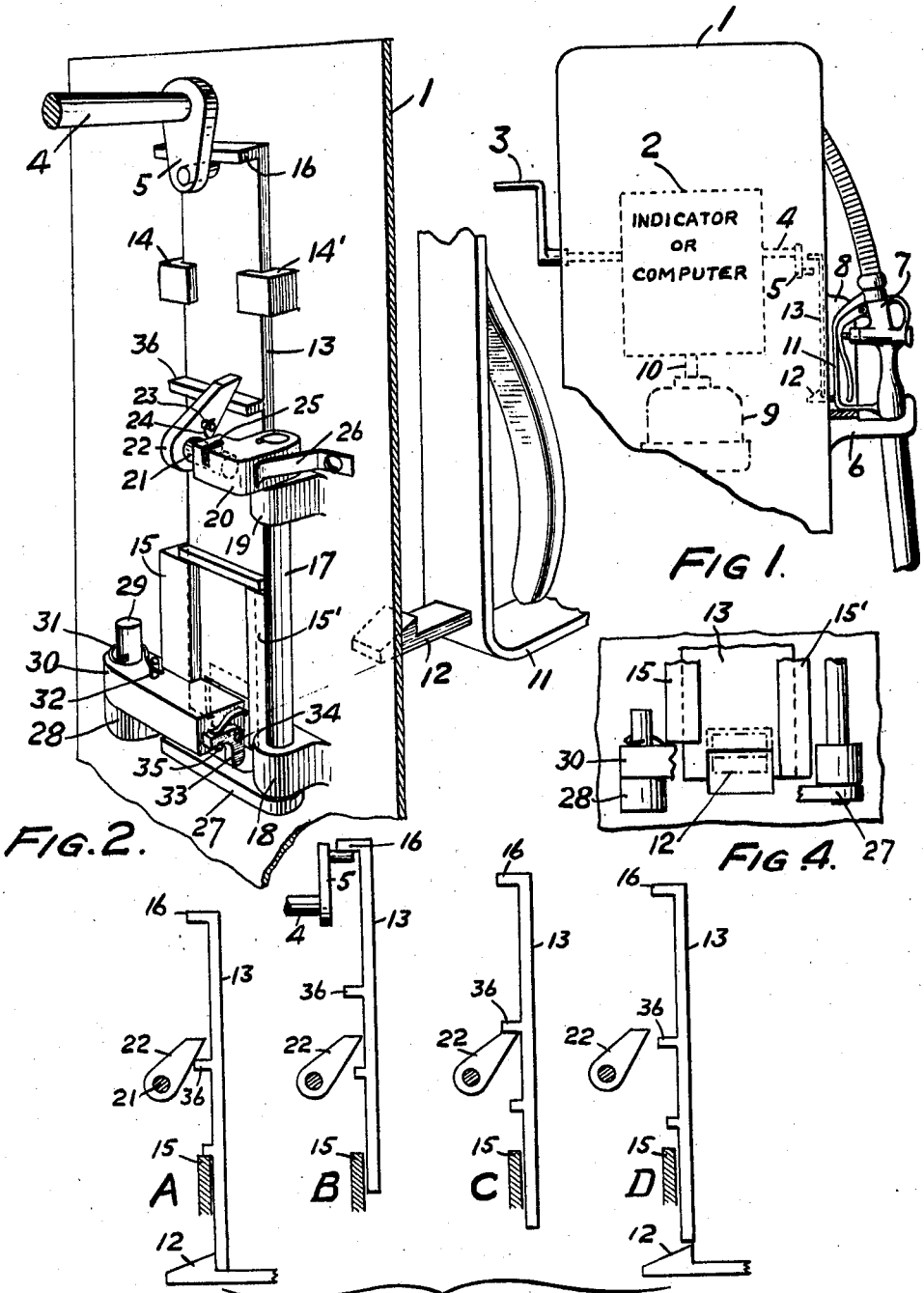

2,171,125

UNITED STATES PATENT OFFICE 2,171,125

FLUID-DISPENSING APPARATUS

Harry Heller, Ardmore, Pa., assignor to Sun Oil Company, Philadelphia, Pa., a corporation of New Jersey Application May 4, 1937, Serial No. 140,675

4 Claims. (Cl. 221—95)

The present invention realtes to fluid dispensing apparatus having quantity and/or price indicating means associated therewith, and more particularly to such apparatus having provisions for the prevention of fraud or mistake on the part of the operator.

More particularly the invention relates to that type of dispensing apparatus which is ordinarily used to dispense gasoline to automotive vehicles and has for its object means for locking the dispensing nozzle on its support so that it cannot be removed until the attendant has returned the indicating or computing mechanism to its zero position.

Other and further objects will appear as the description progresses.

Gasoline dispensing apparatus as used today usually consists of the following elements:

A pump, usually centrifugal, which is driven by a motor, and a meter through which the pump forces the gasoline to the dispensing nozzle. The dispensing nozzle usually has a trigger operated valve associated therewith so that the attendant may first insert the nozzle into the filler opening of an automobile gasoline tank and then fill the tank by operating the valve in the nozzle. Such pumps also have a hook or support adapted to support the nozzle between sales. There is usually provided a computing device which indicates not only the cost of the gasoline dispensed for each particular sale, but also the amount so dispensed. If a computor is not provided there is always provided a dial or other indicating means showing the amount of gasoline dispensed at each sale. Such computator or indicating mechanisms are driven through gearing from the meter, the meter functioning in this case both to meter the gasoline and to furnish the motive power for operating the dial or computor. The indicating devices have associated therewith means operable from the outside of the pump housing to return the indicator or computor to its zero position after each sale has been made and before the next sale is made. In some cases, however, the operators either fraudulently or through mistake do not return the indicator to zero position, thereby depriving a subsequent customer of the full measure of gasoline for which he pays.

It is one of the objects of the present invention to remove the personal element from the operation of such devices, and to that end a locking means is provided interconnecting the zeroizing means with the nozzle support so that when the operator has made a sale and has returned the nozzle to its support he will not be able to remove the nozzle from its support to make a subsequent sale until he has returned the computor in indicator to its zero position.

A better understanding of the invention will be had by reference to the accompanying drawing, of which:

Fig. 1 shows a pump housing in elevation, together with the dispensing nozzle and support therefor.

Fig. 2 is a perspective view showing one form the locking means may take, and its inter-connection with the zeroizing means for the indicator, Fig. 3 is a diagrammatic showing of the latch means, for locking the dispensing nozzle, in its various positions, and Figure 4 is a detail view of the lock mechanism.

Referring now more particularly to the drawing, 1 indicates the pump housing having a computor or indicator 2 diagrammatically represented by dotted lines and a crank 3 for operating the zeroizing mechanism associated with the indicator or computor 2. 4 indicates a shaft extending through the computor and having a crank 5 fixedly connected thereto. 6 indicates a hook or support for the dispensing nozzle 7, the support 6 having lateral wings 8 between which the guard and trigger of the dispensing nozzle are inserted to prevent the operator from accidentally operating the nozzle valve when removing the nozzle from the hook. The numeral 9 indicates diagrammatically the meter through which the fluid being dispensed is forced by means of a pump, not shown. 10 indicates the shaft by means of which the meter operates the indicator or computor.

It will be noted that the meter and indicator or computor are shown only diagrammatically and that the pump is not illustrated at all, this being unnecessary since these elements and their construction and operation are well known to those skilled in the art and may be of different types without departing from the spirit and scope of the present invention. The dispensing nozzle 7 is provided with a guard 11 having a latch 12 fixedly connected thereto, latch 12 being adapted to be inserted through the pump housing 1 and engaged by the gate 13, when in its lowermost position, to securely lock the nozzle 7 in place, until released by operating the zeroizing crank 3. The gate or bolt 13 is slidably mounted between the blocks 14, 14', 15, 15' and the housing 1. As will readily be apparent the gate 13 may be raised by rotating the zeroizing shaft 180°, the crank 5 engaging the flanged portion 16 of the gate 13 and raising it until the crank is rotated 180° from the position shown in Fig. 1, and diagrammatically shown in Fig. 3B.

There is also supported on the casing 1 a shaft 17 which is rotatably mounted in bushings 18 and 19 and which are fixed to the casing 1. Keyed to the upper end of shaft 17 is an arm 20 having a pintle 21 rotatably mounted in one end thereof. Fixedly connected to the other end of the pintle 21 is a pawl 22 having associated therewith a pin 23 and spring 24 normally urging the pawl in the direction of the gate 13. This rotative movement of the pawl 22 is limited by the pin 25 which is inserted in the pintle 21 and slides within a groove cut within the arm 20. The arm 20 is normally urged in a clockwise direction, when viewed from above, by means of a leaf spring 26 affixed to the pump casing 1. The lower end of shaft 17 has fixedly secured thereto an arm 27.

On the opposite side of the gate 13 from the shaft 17 there is affixed a lug 28 having a pintle 29 fixedly connected thereto. Rotatably mounted on the pintle 29 is another arm 30 which is normally urged toward the opening in casing 1 by means of spring 31 affixed to the pintle 29 and acting against a pin 32 affixed to the arm. At the outer end of the arm 30 there is an inverted L-shaped pawl 33 pivotally connected to the arm 30 by a pin 34. The movement of this pawl is restricted by means of a pin 35 inserted in the end of the arm 30. A leaf spring also attached to the end of the arm 30 urges the horizontal arm of the pawl 33 against the pin 35.

When the gate 13 is raised from the position indicated in Figs. 1 and 3A, the pawl 22 is rotated in a counter-clockwise direction by the lug 36 on gate 13. As soon as the lug 36 has passed the pawl 22 it swings back into place against the gate 13. When the shaft 4 and crank 5 have been rotated 360° and returned to the position shown in Fig. 1, the gate 13 will be lowered and come to rest with the lug 36 resting on the pawl 22 as shown in Fig. 3C. In this position the gate 13 is raised above the latch member 12, thereby permitting the nozzle 7 to be removed from the support 6 for the purpose of dispensing gasoline.

When the sale has been completed and the nozzle 7 is again returned to its position on the support 6, the end of the latch 12 will encounter the arm 30 and rotate it away from the casing 1 thus causing the depending arm of the pawl 33 to engage arm 27 affixed to shaft 17, move it outwardly, and rotate shaft 17 in a counter-clockwise direction, as viewed from above. This rotation causes a similar rotation of the arm 20 carrying pawl 22 and removes pawl 22 from engagement with the lug 36 as shown in Fig. 3D. The gate 13, being deprived of support by the pawl 22, drops to its lowermost position and engages the latch 12, preventing removal of the nozzle 7 until the crank 3, shaft 4 and crank 5 are rotated at least 180° to remove the gate from engagement with the latch 12 and place it in position to be engaged by the pawl 22 during the next 180° of rotation of the crank 5.

The indicators or computors which are now generally used throughout the industry are so constructed that it is necessary to make one complete revolution of the crank 3 and therefore shaft 4 and crank 5 in order to clear the computor and return the indicator to zero position. They are also so constructed that once movement of the crank 3 is started it may not be returned to its usual position by a retrograde movement, but must be completely rotated 360°.

As the arm 30 is moved away from the gate 13 by the inner end of the latch 12, thereby also moving the arm 27 by means of pawl 33, the pawl 33 will rid off the end of arm 27, thereby permitting arm 27, shaft 17, arm 20 and pawl 22 to return to their normal position by reason of the action of leaf spring 26. This return then places pawl 22 in position to catch and engage the lug 36 when the crank 5 is subsequently rotated. After the gate has been raised, the nozzle 7, as heretofore described, may be removed, thus permitting arm 30 to return to its inner position. As the arm 30 returns, the pawl 33 engages the inner edge of arm 27 and is rotated to permit the arm 30 to return to its full inner position. When the bell crank has passed completely over arm 27, the leaf spring on the inner end of arm 30 returns the bell crank 33 to its normal position of rest against pin 35.

From the foregoing, it is apparent that once the nozzle 7 is returned to the support 6 at the completion of a sale, it will be impossible for the attendant either through mistake or fraudulent intention to remove the nozzle 7 to make another sale until the indicator or computor is returned to its zero position by rotating crank 3.

It is obvious that the present drawing and description show only one way out of many in which the present invention, in its broadest aspects, can be carried out. It is quite evident that other locking mechanisms could be substituted for that shown in the accompanying drawing for accomplishing the same result, such particular mechanism being capable of design and construction by anyone skilled in the art.

It is also evident that the support 6 might take the form of a hinged lever, the inner end of which would operate the switch controlling the current supply to the pump motor, in which case a double result would be accomplished in that it would be impossible for the pump motor to be started without removing nozzle 7 from its support, which would necessitate, of course, the return of the indicator or computor to zero position.

What I claim and desire to protect by Letters Patent is as follows:

1. In a fluid dispensing apparatus having a dispensing nozzle and a support therefor, latch means on said nozzle, bolt means on said support, mechanism for indicating the amount of fluid dispensed, means for returning the indicating mechanism to its zero position, said last mentioned means having associated therewith mechanism whereby said bolt means is removed from a position where it could engage said latch means when the means for returning the indicating mechanism to zero position is operated, and means associated with said bolt means whereby said bolt means will be brought into locking engagement with said latch means when the nozzle is returned to its support and the indicating means is not in zero position.

2. A fluid dispensing apparatus comprising a housing, an indicator within the housing for indicating the amount of fluid dispensed, a dispensing nozzle, a support for the dispensing nozzle affixed on the outside of said housing, a bolt slidably mounted on the inside of said housing, a latch on said nozzle adapted to extend within said housing when the nozzle is placed on its support so as to be in position to be engaged by said bolt, means for raising said bolt, pawl means for holding said bolt in its raised position, means adapted to be engaged by said latch when it is inserted through the housing to release said pawl means from engagement with said bolt to permit said bolt to engage said latch, and means for simultaneously returning said indicator to its zero position and to raise said bolt.

3. A fluid dispensing apparatus comprising a housing, an indicator within the housing for indicating the amount of fluid dispensed, a dispensing nozzle, a support for the dispensing nozzle affixed to the outside of said housing, a bolt slidably mounted on the inside of said housing, a latch on said nozzle adapted to extend within said housing when the nozzle is placed on its support so as to be in position to be engaged by said bolt, means for raising said bolt, pawl means adapted to oscillate around a vertical and horizontal axis, a lug on said bolt adapted to oscillate said pawl around its horizontal axis when the bolt is raised and to engage said pawl and prevent said bolt from engaging the latch on said nozzle, means adapted to oscillate said pawl on its vertical axis to remove it from engagement with the lug on said bolt, said last named means being operated by the latch on said nozzle when the nozzle is returned to its support.

4. Locking mechanism comprising a horizontally slidable latch, a vertically slidable bolt adapted to engage said latch, a pawl adapted to oscillate around a horizontal and vertical axis to engage or disengage the lug on said bolt, a lug on said bolt adapted to oscillate the pawl about its horizontal axis when the bolt is raised and to be engaged and held in its raised position by the pawl, a vertical shaft having the pawl means fixedly connected to its upper end and an arm fixedly connected thereto at its lower end, said arm being adapted to be swung by said latch and to rotate the pawl about its vertical axis to remove it from engagement with the lug on said bolt and permit the bolt to engage said latch.

HARRY HELLER.